United States Patent

Myers et al.

[11] Patent Number: 6,156,276
[45] Date of Patent: Dec. 5, 2000

[54] DISTRIBUTION APPARATUS FOR SHORT TIME CONTACT OF HYDROCARBON COMPOUNDS WITH PARTICLES

[75] Inventors: Daniel N. Myers, Arlington Heights; Aziz A. Sattar, Bartlett, both of Ill.

[73] Assignee: UOP LLC, Des Plaines, Ill.

[21] Appl. No.: 09/404,908

[22] Filed: Sep. 24, 1999

Related U.S. Application Data

[62] Division of application No. 08/967,525, Nov. 11, 1997, Pat. No. 6,010,620.

[51] Int. Cl.[7] .................................. B01J 8/18; B05B 7/00
[52] U.S. Cl. ........................ 422/140; 422/139; 239/398; 239/417.5; 239/418; 239/433; 239/434
[58] Field of Search ..................... 422/139, 140, 422/141, 142, 172; 239/398, 417.5, 418, 433, 434

[56] References Cited

U.S. PATENT DOCUMENTS

| | | | |
|---|---|---|---|
| 3,071,540 | 1/1963 | McMahon et al. | 208/163 |
| 3,152,065 | 10/1964 | Sharp et al. | 208/157 |
| 4,434,049 | 2/1984 | Dean et al. | 208/153 |
| 4,555,328 | 11/1985 | Krambeck et al. | 208/157 |
| 4,717,467 | 1/1988 | Haddad et al. | 208/113 |
| 4,875,996 | 10/1989 | Hsieh et al. | 208/157 |
| 4,985,136 | 1/1991 | Bartholic | 208/153 |
| 5,061,457 | 10/1991 | Hsieh et al. | 422/140 |
| 5,108,583 | 4/1992 | Keon | 208/157 |
| 5,139,748 | 8/1992 | Lomas et al. | 422/140 |
| 5,242,577 | 9/1993 | Betts et al. | 208/157 |
| 5,296,131 | 3/1994 | Raterman | 208/113 |
| 5,462,652 | 10/1995 | Wegerer | 208/167 |
| 5,958,222 | 9/1999 | Radcliffe et al. | 208/163 |

*Primary Examiner*—Walter D. Griffin
*Attorney, Agent, or Firm*—John G. Tolomei; James C. Paschall

[57] ABSTRACT

An arrangement for the controlled production of an essentially linear array of hydrocarbon feed injection jets maintains stable and reliable jets by passing individual piping for each jet through a support shroud that is located in a contacting vessel. Controlled atomization is provided by independently injecting a uniform quantity of gas medium into each of the plurality of uniformly created feed injection streams upstream of a discharge nozzle that separately discharges each mixed stream of hydrocarbons and gas medium into a stream of catalyst particles at or about the inner end of the support shroud. The feed injection jets are suitable for positioning in an inner location of a large contacting vessel. Uniformity of distribution is obtained by dividing the hydrocarbons streams from an oil header into an individual oil conduit for each spray injection nozzle. The individual oil conduits each pass the feed perpendicularly into a separate mixing conduit that discharges a mixture of gas medium and oil into each spray nozzle. Another header supplies individual gas conduits that pass the gas medium longitudinally into the mixture conduits at a right angle to the catalyst stream. The ends of the mixture conduits dispose the spray injection nozzles in positions to produce an array of feed injection jets.

7 Claims, 4 Drawing Sheets

DISTRIBUTION APPARATUS FOR SHORT TIME CONTACT OF HYDROCARBON COMPOUNDS WITH PARTICLES

CROSS-REFERENCE TO RELATED APPLICATION

This application is a Divisional application of Ser. No. 08/967,525 filed Nov. 11, 1997, now U.S. Pat. No. 6,010,620, the contents of which are hereby incorporated by reference.

BACKGROUND OF THE INVENTION

1. Field of the Invention

This invention relates generally to the dispersing of liquids into fluidized solids. More specifically, this invention relates to a method and apparatus for dispersing a hydrocarbon feed into a stream of fluidized catalyst particles.

2. Description of the Prior Art

There are a number of continuous cyclical processes employing fluidized solid techniques in which an at least partially liquid phase stream containing hydrocarbon compounds contacts the fluidized solids in a contacting zone and carbonaceous or other fouling materials are deposited on the solids. The solids are conveyed during the course of the cycle to another zone where foulants are removed in a rejuvenation section or, more specifically, in most cases, carbon deposits are at least partially removed by combustion in an oxygen-containing medium. The solids from the rejuvenation section are subsequently withdrawn and reintroduced in whole or in part to the contacting zone.

One of the more important processes of this nature is the fluid catalytic cracking (FCC) process for the conversion of relatively high-boiling hydrocarbons to lighter hydrocarbons. The hydrocarbon feed is contacted in one or more reaction zones with the particulate cracking catalyst maintained in a fluidized state under conditions suitable for the conversion of hydrocarbons.

It has been a long recognized objective in the FCC process to maximize the dispersal of the hydrocarbon feed into the particulate catalyst suspension. Dividing the feed into small droplets improves dispersion of the feed by increasing the interaction between the liquid and solids. Preferably, the droplet sizes become small enough to permit vaporization of the liquid before it contacts the solids. It is well known that agitation or shearing can atomize a liquid hydrocarbon feed into fine droplets which are then directed at the fluidized solid particles. A variety of methods are known for shearing such liquid streams into fine droplets. U.S. Pat. No. 3,071,540 discloses a feed injection apparatus for an FCC unit wherein a high velocity stream of gas, in this case steam, converges around a stream of oil upstream of an orifice through which the mixture of steam and oil is discharged. Initial impact of the steam with the oil stream and subsequent discharge through the orifice atomizes the liquid oil into a dispersion of fine droplets which contact a stream of coaxially flowing catalyst particles. U.S. Pat. No. 4,434,049 shows a device for injecting a fine dispersion of oil droplets into a fluidized catalyst stream wherein the oil is first discharged through an orifice onto an impact surface located within a mixing tube. The mixing tube delivers a cross flow of steam which simultaneously contacts the liquid. The combined flow of oil and steam exits the conduit through an orifice which atomizes the feed into a dispersion of fine droplets and directs the dispersion into a stream of flowing catalyst particles.

Other known methods for feed dispersion include specific injection methods. U.S. Pat. No. 4,717,467 shows a method for injecting an FCC feed into an FCC riser from a plurality of discharge points. U.S. Pat. No. 5,108,583 discloses a method wherein hydrocarbons and steam are supplied from individual headers and combined in conduits to supply a steam and hydrocarbon mixture to a distribution nozzle for injection into an FCC riser.

The processing of increasingly heavier feeds in FCC type processes and the tendency of such feeds to elevate coke production and yield undesirable products has led to new methods of contacting feeds with catalyst. Of particular recent interest have been methods of contacting FCC catalyst for very short contact periods. U.S. Pat. No. 4,985,136, the contents of which are hereby incorporated by reference, discloses an ultrashort contact time process for fluidized catalytic cracking, that contacts an FCC feed with a falling curtain of catalyst for a contact time of less than 1 second followed by a quick separation. U.S. Pat. No. 5,296,131, the contents of which are hereby incorporated by reference, discloses a similar ultrashort contact time process that uses an alternate falling catalyst curtain and separation arrangement. The ultrashort contact time system improves selectivity to gasoline while decreasing coke and dry gas production by using high activity catalyst that previously contacted the feed for a relatively short period of time. The inventions are specifically directed to zeolite catalysts having high activity.

The type of injection desired for short contact time arrangements poses special problems for the injection of the feed into the catalyst. Most desirably, the feed is injected in an array of identical feed injection streams that uniformly contact a stream of catalyst flowing in a compatible pattern. Typically, the uniform array of feed injection nozzles is arranged to provide a plurality of discrete jets that extend horizontally and shoot the feed into a thin band of catalyst that falls in a direction at least partially transverse to the flow of jets. The jet array should extend over the width of the thin band which greatly exceeds its depth. In other words, the arrangement usually creates a vertical line of catalyst that is contacted by an array of jets that extends over a horizontal line. Establishing the thin but extended band of catalyst requires equipment that usually places the band toward the center of a contacting vessel. In turn, the nozzles that create the jets must also be located close to the band of catalyst. Creating an extended array of jets at a location removed from the wall of the contacting vessel creates distribution and structural problems. The distribution problems require that equal amounts of gas and oil reach each nozzle that defines the individual jet. From the structural side, providing a reliable assembly of nozzles demands that the distributor withstand possible erosive effects of the catalyst and the vibration effects imposed by the large flowing mass of catalyst and the cyclic input from numerous pieces of equipment.

SUMMARY OF THE INVENTION

An object of this invention is to reliably and consistently deliver a uniform mixture of a gas phase stream and an at least partially liquid phase oil stream in an extended array of jets to a band of catalyst.

A further object of this invention is to increase the dispersion of a mixed phase stream over the flowing surface area of a thin catalyst band.

This invention is a distributor nozzle arrangement and a distribution method for delivering a uniform linear array of feed jets comprising mixed phase media into an extended thin band of catalyst. The distributor uses at least two manifolds for separate distribution of gas and an at least partially liquid phase oil stream. Each manifold delivers a uniform amount of gas phase media, typically steam, and oil to a plurality of gas and oil distribution pipes. Oil and gas from pairs of the distribution pipes mix into a common distribution pipe that delivers the mixture of oil and gas to a spray nozzle. The common distribution pipes pass through an outer face of a shroud for support thereto, are surrounded by the shroud, and pass though an inner face of the shroud that supports the nozzles and exposes only the nozzle ends to the catalyst environment. The invention solves the problem of providing a linear array of spray jets at a location close to a falling curtain of catalyst that is located in a large vessel and away from the wall of the vessel.

Accordingly, in a specific embodiment, this invention is a method of injecting a substantially linear array of feed jets comprising an at least partially liquid phase of hydrocarbon compounds and a gas into a stream of fluidized particles. The method divides a central stream of hydrocarbon compounds into a plurality of uniform hydrocarbon substreams and a central stream of gas into a plurality of uniform gas substreams equal in number to the hydrocarbon substreams. Individual conduits combine each of the gas substreams with one of the hydrocarbon substreams to provide a plurality of combined streams each carried by the individual conduits. Gas and hydrocarbon compounds mix in the conduits to produce a fluid mixture. A fluid nozzle discharges a jet of the fluid mixture from the end of each conduit into a contacting vessel. A dispersion of catalyst particles is passed through the contacting vessel in a predetermined flow pattern. Each of the jets is directed into a different portion of the predetermined catalyst flow pattern. An outer length of each conduit is fixed to an outer end of a containment shroud that surrounds all of said conduits and an inner length of each conduit or nozzle is guided by an inner end of the containment shroud. The containment shroud is positioned to extend into the contacting vessel.

Another embodiment of this invention is an apparatus for injecting a plurality of uniform jets into an extended dispersion of moving catalyst particles within a contacting vessel. The apparatus has an extended shroud with an outer end for extending out of a contacting vessel and an inner end for extending into a contacting vessel. A plurality of mixture conduits project into and are fixed with respect to the outer end of the shroud. An outlet nozzle is fixed to a distal end of each of the mixture conduits and defines an outlet located proximate to the inner end of the shroud. Means are provided for guiding the distal end of each of the nozzles with respect to the inner end of the shroud. A plurality of gas conduits supplies each of the mixture conduits with an equal amount of a gas phase material. A plurality of liquid conduits supplies each mixture conduit with an equal amount of an at least partially liquid phase fluid. A gas header supplies each of the gas conduits with an equal amount of the gas phase material. A liquid header supplies each of the liquid conduits with an equal amount of the liquid phase fluid.

Additional objects, embodiments, and details of this invention can be obtained from the following detailed description.

DETAILED DESCRIPTION OF THE INVENTION

Figure 1:
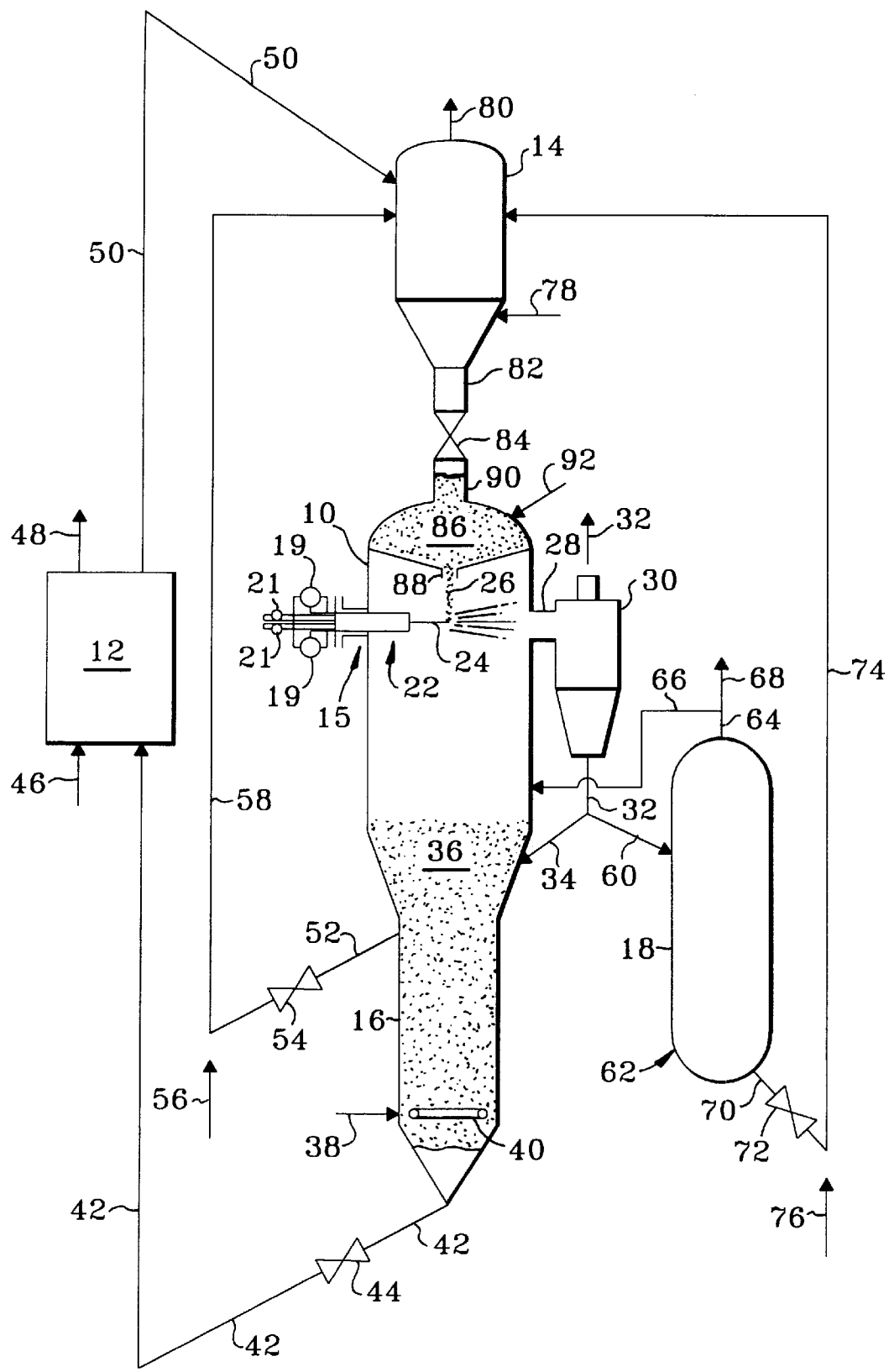
FIG. 1 is a schematic illustration of a short contact time FCC reactor arrangement that uses the distributor and method of this invention.

This invention is more fully explained in the context of an FCC process. The drawing of this invention shows a typical FCC process arrangement. The description of this invention in the context of the specific process arrangement shown is not meant to limit it to the details disclosed therein. The FCC arrangement shown in FIG. 1 consists of a reactor 10, a regenerator zone 12, a blending vessel 14 which can also serve as a secondary stripper, a primary stripping vessel 16, and a displacement stripping vessel 18. The arrangement circulates catalyst and contacts feed in the manner hereinafter described.

The catalyst used in the FCC application of the process can include any of the well-known catalysts that are used in the art of fluidized catalytic cracking. These compositions include amorphous-clay type catalysts which have, for the most part, been replaced by high activity, crystalline alumina silica or zeolite-containing catalysts. Zeolite-containing catalysts are preferred over amorphous-type catalysts because of their higher intrinsic activity and their higher resistance to the deactivating effects of high temperature exposure to steam and exposure to the metals contained in most feedstocks. Zeolites are the most commonly used crystalline alumina silicates and are usually dispersed in a porous inorganic carrier material such as silica, alumina, or zirconium. These catalyst compositions may have a zeolite content of 30% or more. Zeolite catalysts used in the process of this invention will preferably have a zeolite content of from 25–80 wt-% of the catalyst. The zeolites may also be stabilized with rare earth elements and contain from 0.1 to 10 wt-% of rare earths.

Suitable liquid media for this invention include any liquid stream that will enter the distributor as a liquid and is mixed with a gas. For the FCC process, feedstocks suitable for processing by the method of this invention, include conventional FCC feeds and higher boiling or residual feeds. The most common of the conventional feeds is a vacuum gas oil which is typically a hydrocarbon material having a boiling range of from 650° to 1025° F. and is prepared by vacuum fractionation of atmospheric residue. These fractions are generally low in coke precursors and the heavy metals which can deactivate the catalyst. Heavy or residual feeds, i.e., boiling above 930° F. and which have a high metals content, are finding increased usage in FCC units. These residual feeds are characterized by a higher degree of coke deposition on the catalyst when cracked. Both the metals and coke serve to deactivate the catalyst by blocking active sites on the catalysts. Coke can be removed to a desired degree by regeneration and its deactivating effects overcome. Metals, however, accumulate on the catalyst and poison the catalyst. In addition, the metals promote undesirable cracking thereby interfering with the reaction process. Thus, the presence of metals usually influences the regenerator operation, catalyst selectivity, catalyst activity, and the fresh catalyst makeup required to maintain constant activity. The contaminant metals include nickel, iron, and vanadium. In general, these metals affect selectivity in the direction of less gasoline and more coke and dry gas. Due to these deleterious effects, the use of metal management procedures within or before the reaction zone are anticipated in processing heavy feeds by this invention. Metals passivation can also be achieved to some extent by the use of an appropriate lift gas in the upstream portion of the riser.

Looking then at the reactor side of FIG. 1, FCC feed from headers 19 are mixed with an additional gas phase fluidizing medium, in this case steam, from headers 21, and charged to an inner part 22 of a distributor 15. Distributor 15 atomizes the feed into a stream of fine liquid droplets 24 that contacts a falling curtain of catalyst 26. Contact of the feed with the catalyst causes a rapid vaporization and a high velocity discharge of catalyst in the direction of a cyclone inlet 28.

Contact between the feed and catalyst cracks the heavier hydrocarbons into lighter hydrocarbons and produces coking of the most active catalyst sites on the catalyst. As the catalyst moves toward cyclone inlet 28, a portion of the catalyst particles falls from the stream of mixed catalyst and feed downwardly through the reactor vessel into the top of primary stripping zone 16. The transverse contacting of the feed with the vertically falling catalyst curtain creates a beneficial trajectory of the catalyst and feed mixture towards inlet 28. Projecting the mixture of catalyst and cracked vapors toward the inlet 28 has the advantage of separating the catalyst particles. Advantageously, the heavier particles, those containing the most coke, preferentially fall into stripper 16 while the lighter less coked particles enter cyclone inlet 28 and are separated in cyclone 30. However, it is not necessary to the practice of this invention that the feed direct the catalyst in any particular direction.

The feed from nozzles of inner part 22 preferably contacts the curtain of falling catalyst in a transverse direction to obtain a quick contacting between the feed and the catalyst particles. For the purposes of this description, the expression 'transversely contacting' means the feed does not flow parallel to the direction of the falling curtain. The distributor 15 will produce a spray pattern that is compatible with the geometry of the falling curtain. Where the discharge point forms an annular falling curtain of catalyst, the feed injector will produce a radial pattern of flow that passes outwardly to contact the feed. Where the falling curtain has a linear shape as depicted in the FIGURE, the feed injector will generally produce a horizontal pattern of atomized liquid. In any arrangement of hydrocarbon feed and catalyst contacting, the mixture moves rapidly towards a separation device such that the hydrocarbons are separated from the catalyst after a contact time of less than 1 second, and preferably, the feed and catalyst mixture enters a separation device after a contact time of from 0.5 to 0.01 seconds. After the initial contacting, feed may be directed upwardly or downwardly but it is preferentially directed toward the inlet 28. Accordingly, in a typical arrangement, the feed is discharged in a substantially horizontal direction to flow perpendicularly into contact with an essentially vertical curtain of catalyst. When contacting the falling curtain of catalyst, the feed will typically have a velocity of greater than 10 ft/sec and a temperature in the range of from 300° to 600° F. The catalyst-to-hydrocarbon ratio in the contacting vessel is at least 10:1.

Cyclone 30 provides an inertial separation device that rapidly removes the product vapors from the FCC catalyst. Product vapors are recovered from the cyclone via a line 32 for further separation in a main column separation section. Catalyst separated by cyclone 30 flows down to the bottom of the cyclone where a line 32 removes the catalyst particles. From line 32, the catalyst may be directed into primary stripping zone 16 or displacement stripping zone 18. Typically, only one of lines 34 or 60 is provided such that catalyst flows only into primary stripping zone 16 or displacement stripping zone 18. Suitable flow control means (not shown) may also be positioned in conduits 34 or 60 to selectively direct the flow of catalyst from line 32 into one or the other of stripping zone 16 or displacement stripping zone 18.

Line 34 carries catalyst from the cyclone into primary stripping zone 16 where the catalyst is combined with heavier catalyst particles that fall directly into the top of a catalyst bed 36. Stripping fluid, typically steam, enters primary stripping zone 16 via a line 38 and a distributor 40. Primary stripping zone 16 may contain baffles or other internal trays or arrangements to increase contacting between the stripping fluid and the catalyst. As a stripping fluid flows countercurrently to the bed, the stripping fluid primarily displaces hydrocarbons in the upper portion of bed 36 and more fully strips the catalyst by desorbing adsorbed hydrocarbons from the core volume of the catalyst in the lower portions of bed 36. A line 42 withdraws the most fully stripped catalyst from the bottom of primary stripping zone 16 at a rate controlled by control valve 44. Spent catalyst leaving the stripping zone will typically have an average coke concentration of from 0.5 to 1.0 wt-%.

Line 42 transfers spent catalyst to the regeneration zone 12 where a combustion gas carried by a line 46 contacts the catalyst under coke combustion conditions within regeneration zone 12 to remove coke from the catalyst particles. Combustion of the coke generates flue gases that contain the by-products of coke combustion and are removed from the regeneration zone via a line 48 and fully regenerated catalyst particles that have a coke concentration of less than 0.2 wt-% and preferably less than 0.1 wt-%. Regeneration zone 12 may be any type of known FCC regenerator or arrangement.

A line 50 transports catalyst from the regeneration zone into the blending vessel 14. The blending vessel also receives a portion of the spent catalyst from the reaction zone. A line 52 withdraws spent catalyst from an upper section of primary stripping zone 16 at a rate set by control valve 54. A lift medium such as steam from line 56 pneumatically conveys the spent catalyst upwardly from a line 58 into blending vessel 14. Line 52 withdraws catalyst that has primarily undergone stripping for displacement of hydrocarbons from the void spaces between the catalyst particles.

Displacement stripping zone 18 receives catalyst particles from the cyclone via a line 60. Preferentially, the catalyst particles have a lower coke content. A stripping gas enters the bottom of displacement stripper 18 via a line 62 and performs a partial stripping of the catalyst which is, again, to primarily displace hydrocarbons from void spaces between the catalyst particles and maximize the recovery of wider hydrocarbon products. Spent gas and hydrocarbon products are taken overhead from displacement stripper 18 via a line 64 and either transferred directly back to the reaction zone via a line 66 for recovery in cyclone 30 or removed separately via line 68 for independent recovery in a downstream separation section.

A line 70 removes the stripped catalyst at a rate regulated by a valve 72 for lifting to the blending vessel 14 in a line 74 with the assistance of an appropriate lift gas from a line 76. Blending vessel 14 mixes the catalyst. Blending vessel 14 receives the hot catalyst from line 50 and spent catalyst from either or both of lines 58 and 74.

For purposes of blending and mixing, an additional fluidizing gas may enter blending vessel 14 via a line 78.

Blending vessel 14 also provides a degassing function for venting fluidizing gases that convey the catalyst into the vessel. Fluidization gas entering vessel 14 from line 78 promotes mixing of catalyst within the vessel. Fluidizing gas entering the blending zone will normally establish a superficial velocity of between 1 to 3. The blending vessel will ordinarily maintain a dense catalyst bed. Conditions within the blending zone typically include a density in a range of from 30 to 40 lbs/ft$^3$. Turbulent mixing within the dense catalyst bed fully blends the regenerated and spent catalyst. In this manner, mixing vessel 14 operates at least as a blending zone to supply the blended catalyst streams to the reactor and regenerator. A vent line 80 passes fluidizing gas out of the top of mixing vessel 14.

A standpipe 82 at the bottom of blending vessel 14 supplies the blended catalyst mixture to a slide valve 84 that regulates the addition of the catalyst to the reaction zone. Catalyst from the slide valve enters a discharge chamber 86 that supplies catalyst to a discharge point 88. Discharge point 88 supplies a falling curtain of catalyst 26 that contacts the feed stream 24. The falling curtain of catalyst is usually substantially vertical and primarily flat. The amount of catalyst discharged through discharge point 88 is a function of the size of the discharge point and the pressure head at discharge point 86. The pressure at discharge point 88 may be controlled in a variety of ways. Static pressure head may be provided by varying the height of a standpipe section 90 and controlling the level in that section through the regulation of catalyst passing through valve 84. A pressurization fluid may also be injected into discharge chamber 86 via a line 92. The pressurization fluid may provide a fluidizing function to maintain flow through discharge point 88 or may be used to increase the pressure in discharge point 88 and adjust the velocity of the curtain of catalyst passing through the discharge point. The falling curtain of catalyst will usually have a velocity of at least 5 ft/sec. The velocity through the discharge point may be increased in order to carry the mixture of hydrocarbon and catalyst farther down into the reactor vessel, thereby lengthening the flow path and the residence time of the hydrocarbons within the reaction zone.

The nozzles creating jets 24 are sized to provide a fluid velocity out of openings in a range of from 30 to 400 ft/sec and preferably in the range of 100 to 300 ft/sec. In accordance with typical FCC practice, the feed exits the nozzle openings in distributor 15 as a spray. Droplet size within the spray and the velocity of the spray determines momentum of the feed as it enters the interior of vessel 10. It is difficult to increase the momentum of the feed above a given level since the velocity of the feed injection is inversely proportional to the size of the droplets in the emanating spray. Higher velocities for the spray tend to directly increase the momentum of the spray but indirectly decrease the momentum by reducing the size of the exiting droplets. Conversely, the reduced momentum that results directly from lower spray velocities is offset by the typical production of larger droplets. In the preferred practice of this invention where the fluid entering the jets comprises a substantially liquid oil feed, lower jet velocities are preferred.

The dispersion of the feed into yet finer droplets is promoted by imparting sufficient energy into the liquid. Where desired, any of the prior art methods may be used in combination with the feed injection arrangement of this invention. In some cases, this invention will be practiced with some addition of a gaseous diluent such as steam to the feed before discharge through the orifices. The addition of the gaseous material can aid in the atomization of the feed. A minimum quantity of gaseous material is usually equal to about 0.2 wt-% of the combined liquid and gaseous mixture and is typically commingled with the liquid before its discharge through the nozzles. Typically, the quantity of any added steam is 5 wt-% or less of the combined gaseous and liquid mixture. Atomization will, for most liquids, produce droplets in a size range of from 50 to 750 microns.

The liquid or feed entering the distributor 15 through manifold 19 will usually have a temperature below its initial boiling point but a temperature above the boiling point of any steam or gaseous medium that enters the distribution device 15 along with the liquid. The length of the mixture conduit provides sufficient time for blending of the gas and liquid stream. This blending is typically mild and normally will add a pressure drop of less than 10 psi to the system.

Figure 2:
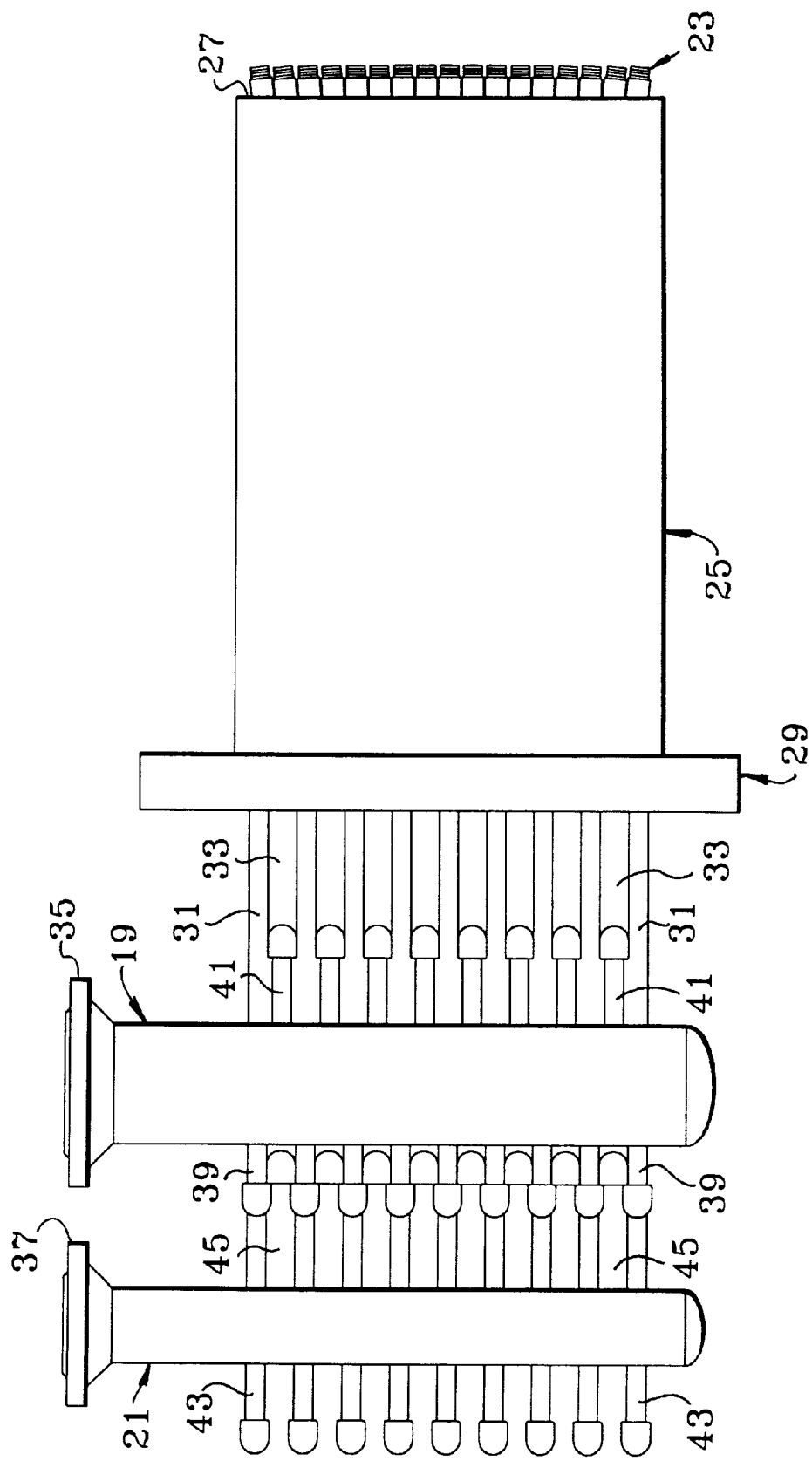
FIG. 2 is a top view of the distributor of this invention depicted in FIG. 1.

FIG. 2 shows the depicted form of distributor 15 in more detail. FIG. 2 is a top view of the distributor showing a plurality of jets 23 for injecting the liquid and gaseous dispersion into contacting vessel 10. The nozzles 23 are orientated to inject an atomized mixture of fluids directly out from distributor 15 in a straight flow pattern from the more centrally located nozzles. Towards the periphery of shroud 25, nozzles 23 are angled to orient the injected atomized liquid over a wider pattern and to maintain an even spacing between jets. Jets 23 may be angled in this manner to cover any length or configuration of particular flow pattern of the catalyst dispersion that they contact.

An extended shroud extends into contacting vessel 10 and retains nozzles 23 at a face 27 located at an inner end of the shroud. A flange 29 forms the outer end of the shroud through which mixture conduits 31 and 33 extend. Flange 29 is a blind flange that is preferably bolted to a similarly open flange in contacting vessel 10 to thereby facilitate insertion and removal of distributor 15.

Conduits 31 and 33 carry a combined mixture of the liquid and gas to nozzles 23 through shroud 25. Shroud 25 may be an open structure that provides sufficient rigidity to prevent vibration or damage of the conduits 31 and 33 inside contacting vessel 10. Preferably, shroud 25 is completely closed and contains insulating material therein to reduce the temperature of the distributor 15 at the outer end of shroud 25.

The liquid and the gaseous components of the mixture are transferred to conduits 31 and 33 by the liquid manifold 19 and the gas manifold 21, respectively. Both manifolds have a suitable connection 35, 37 for receiving separate supplies of liquid and gas from a suitable source. Manifold 35 delivers liquid to conduits 31 through liquid conduits 39 and liquid conduits 41 that supply liquid to mixture conduits 31 and 33, respectively. Gas header 21 supplies gas to combined conduits 31 and 33 through gas conduits 43 and 45, respectively.

Figure 3:
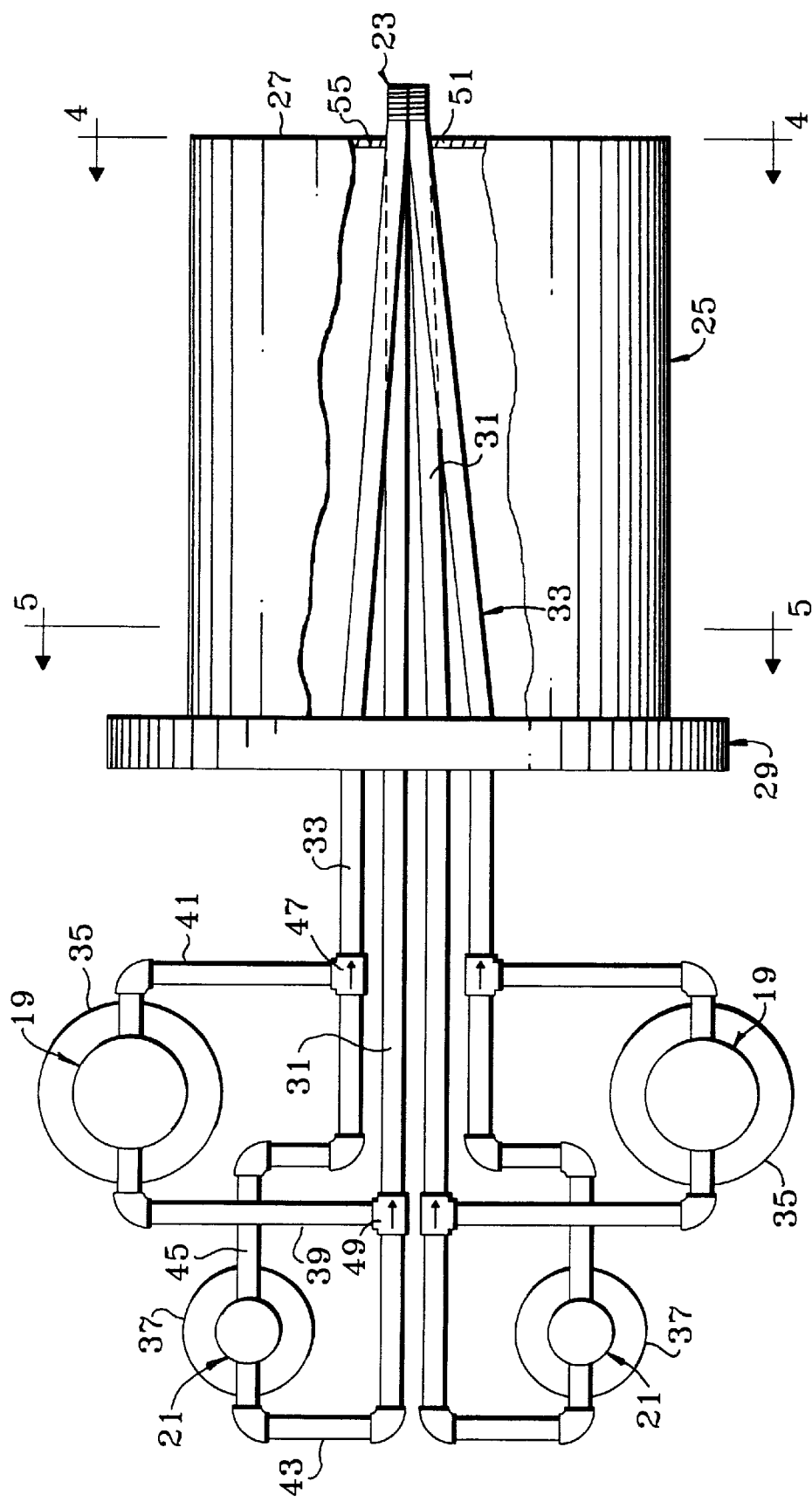
FIG. 3 is a partially broken side view of the distributor of FIG. 2.
Figure 4:
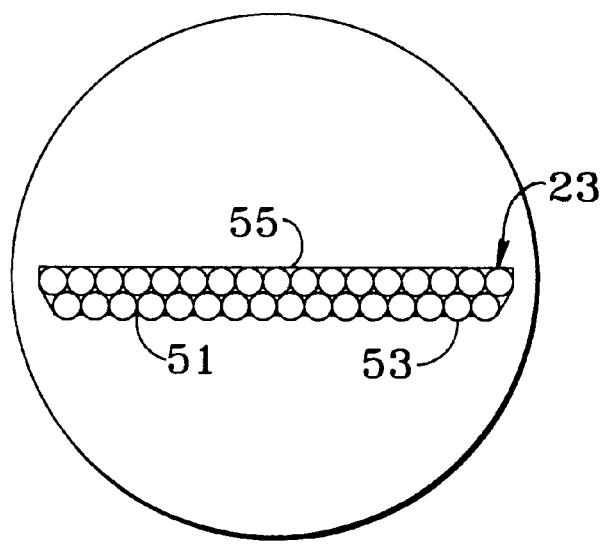
FIG. 4 is a section of the distributor of FIG. 1 taken across lines 4—4.
Figure 5:
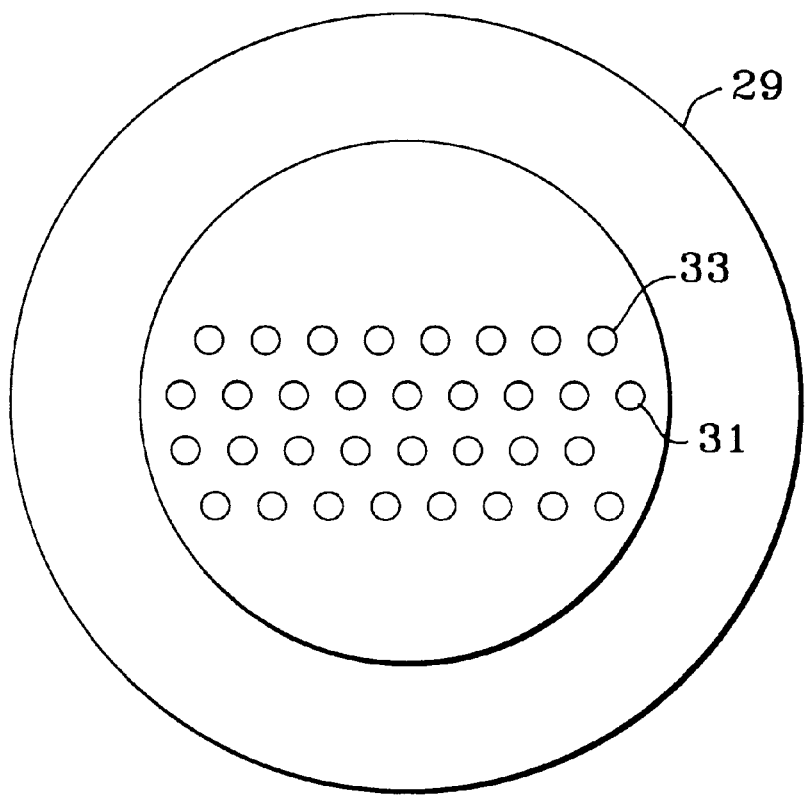
FIG. 5 is a section of the distributor of FIG. 1 taken across lines 5—5.

The piping configuration of FIG. 2 is more clearly disclosed in FIG. 3 that shows a horizontal view of distributor 15. On the liquid side, manifold 19 supplies liquid to conduit 41 which flows perpendicularly into shearing admixture with gas from conduit 45 through a "T" 47. The combined flow from conduits 41 and 45 enters conduit 33 which passes through blind flange 29 into shroud 25. Conduit 33 is angled downwardly to provide a combined mixture of liquid and gas to injection nozzles 23 which are located just outside of the face 27 of shroud 25. In a similar manner, manifold 19 also supplies liquid to a conduit 39 which again perpendicularly discharges the liquid into shearing contact with gas provided by header 21 through conduit 43 into a "T" 49. "T" 49 supplies liquid into conduit 31 which again is fixed to and passes through blind flange 29 at an intermediate portion of conduit 33. Conduit 33 again discharges an atomized mixture of gas through nozzles 23. The lower set of manifolds 19 and 21 again supply liquid and gas to conduits 31 and 33 to supply gas to a lower set of jets 23 in the manner just described. The length of pipes 31 and 33 between the point of fluid addition and jets 23 can also provide additional mixing when a gas phase is present.

"T"s 47 and 49 may be designed to provide a pressure drop to either the gas or the liquid mixtures. The pressure drop will serve to equalize flow out of the headers into each conduit 41 or 43. In some arrangements where the path for piping such as 41, 39 and 45 and 43 are sufficiently uniform and the pipes are small enough in diameter, they will provide adequate pressure drop to assure uniform delivery of liquid and any gas out of headers 19 and 21.

FIG. 3 shows jets 23 extended from the outer face of the shroud 27. The only requirement of the invention is that the nozzles 23 at the distal ends of pipes 31 and 33 are guided with respect to the outer end of the shroud to minimize vibration and damage to the relatively small pipes 31 and 33. Accordingly, nozzles 23 may be located in the face 27 or may be stepped inwardly from face 27 and supported by an appropriate channel or other structure located in the inner end of shroud 27.

The arrangement of the nozzles 23 is further illustrated in Section 4—4 of FIG. 4. As shown in FIG. 4, the nozzles 23 provide a primarily linear array in upper and lower rows. All of the nozzles are offset to provide a broad band of linear feed contacting in a desired flow pattern. Nozzles 23 may be designed to provide any desired flow pattern of dispersed and atomized liquid out of each nozzle. The nozzles may have an outlet configuration that provides a concentrated cylindrical jet or may be arranged to provide fan-shaped patterns to increase the vertical distance over which the dispersed liquid contacts the dispersion of moving catalyst particles.

Face 27 of shroud 25 guides the distal end of conduit 33. A plate edge 51 provides a smooth surface upon which the conduits 31 and 33 or nozzles 23 rest to guide the end of the nozzles and providing a sliding support that allows for relative expansion between the shroud and the conduits. Plate edge 51 may also define a groove or channel 53 that inhibits sideways movement of nozzles 23. The channel will preferably have rounded lead and trailing edges to permit smooth movement of the conduits or nozzles through the channel. The total vertical height of the slot through which the conduit extends may be limited by edge 55 to limit upward as well as downward deflection.

An intermediate portion of pipes 31 and 33 is also fixed into blind flange 29 as shown by Section 5—5 of FIG. 5. Pipes 33 and 31 are offset from each other in two rows to facilitate the attachment to blind flange 29 and to provide clearance for the outer piping configuration that supplying liquid and gas from headers 19 and 21 to each individual pipe 31 and 33. A rigid attachment of pipes 31 and 33 to blind flange 29 can also assist in supporting the outer piping of distributor 19.

A typical arrangement for distributor 19 will use nominal two-inch pipe for all of the gas and liquid conduits and the combined conduits that supply the gas and liquid to nozzles 23. The nozzles receiving the mixture of gas and liquid will also have a similar nominal pipe size with a restricted orifice opening at its end to provide the concentrated jet. Suitable orifice openings for the jet will have a configuration that provides the desired flow path out of the jet. A preferred flow path is provided by an elliptical opening. The number of nozzles used will be selected to provide the desired dimensions and arrangement of the jet array injected by the distributor. Suitable nozzles for this type of feed distributor can be obtained from Lechler Inc. located in St. Charles, Ill.

In most cases, the contacting vessel will not expose the feed distributor to significant concentrated flows of catalyst. The flow of catalyst into which the nozzles inject the dispersed fluid is spaced away from the nozzles so that under ordinary circumstances, direct erosion from catalyst will not have a significant impact on the distributor 15. However, for those unusual circumstances where there is disruption in the flow path of catalyst, any arrangement that places the exposed nozzles outside of shroud 25 should use an abrasion-resistant material for the nozzles such as a stellite or other erosion-resistant metals that are well known to those skilled in the art.

What is claimed is:

1. An apparatus for injecting a plurality of uniform jets into an extended dispersion of moving catalyst particles within a contacting vessel, said apparatus comprising:

an extended shroud having an outer end for extending out of a contacting vessel and an inner end for extending into a contacting vessel;

a plurality of mixture conduits projecting into and guided with respect to said outer end of said shroud;

an outlet nozzle fixed to a distal end of each of said mixture conduits and defining an outlet located proximate to the inner end of said shroud;

means for guiding the distal end of each of said nozzles with respect to the inner end of said shroud for axial sliding movement with respect thereto;

a plurality of gas conduits for supplying each of said mixture conduits with an equal amount of a gas phase material;

a plurality of liquid conduits for supplying each said mixture conduits with an equal amount of an at least partially liquid phase fluid;

a gas header for supplying each of said gas conduits with an equal amount of said gas phase material; and, a liquid header for supplying each of said liquid conduits with an equal amount of said liquid phase fluid.

2. The apparatus of claim 1 wherein said outer end of said shroud comprises a flange for positioning said shroud in a contacting vessel.

3. The apparatus of claim 1 wherein each of said liquid conduits and gas conduits communicates with a "T" for converging flow into said mixture conduit and said "T" defines an orifice on its upstream side for equalizing flow through at least one of said liquid conduit or said gas conduit.

4. The apparatus of claim 1 wherein said nozzles are arranged to discharge an essentially linear array of jets.

5. The apparatus of claim 1 wherein said shroud comprises a cylinder and the interior of said cylinder is insulated.

6. The apparatus of claim 1 wherein said mixture conduit is positioned to receive a coaxial flow from said gas conduit and a perpendicular flow from said liquid conduit.

7. The apparatus of claim 1 wherein said means for guiding comprises a channel that receives a bottom portion of the mixture conduits or the nozzles.

* * * * *